United States Patent [19]
Stewart

[11] Patent Number: 5,488,833
[45] Date of Patent: Feb. 6, 1996

[54] TANGENTIAL FLOW COLD TRAP

[76] Inventor: Jeffrey Stewart, 690-D Avenida Sevilla, Laguna Hills, Calif. 92653

[21] Appl. No.: 312,097

[22] Filed: Sep. 26, 1994

[51] Int. Cl.$^6$ ................................................. B01D 8/00
[52] U.S. Cl. .................................... 62/55.5; 118/715
[58] Field of Search ........................ 62/55.5; 118/715

[56] References Cited

U.S. PATENT DOCUMENTS

| | | | |
|---|---|---|---|
| 3,044,270 | 7/1962 | Biever | 62/55.5 |
| 3,288,728 | 11/1966 | Gorham | 260/2 |
| 3,300,332 | 1/1967 | Gorham | 117/100 |
| 3,342,754 | 9/1967 | Gorham | 260/2 |
| 3,385,953 | 5/1968 | Henneberger | 219/390 |
| 3,472,795 | 10/1969 | Tittman | 260/2 |
| 3,603,903 | 3/1970 | Shaw | 260/2 |
| 3,699,216 | 8/1971 | Stewart | 117/72 |
| 3,712,074 | 1/1973 | Boissin | 62/55.5 |
| 3,719,166 | 12/1973 | Gereth | 118/18 |
| 3,753,773 | 8/1973 | Lee | 117/161 |
| 3,895,135 | 7/1975 | Hofer | 427/248 |
| 3,908,046 | 9/1975 | Fitzpatrick et al. | 427/216 |
| 4,508,054 | 4/1985 | Baumberger et al. | 118/718 |
| 4,592,306 | 6/1986 | Gallego | 118/719 |
| 4,649,859 | 3/1987 | Wanlass | 118/715 |
| 4,683,143 | 7/1987 | Riley | 427/8 |
| 4,760,244 | 7/1988 | Hokynar | 219/390 |
| 4,825,808 | 5/1989 | Takahashi et al. | 118/719 |
| 4,852,516 | 8/1989 | Rubin et al. | 118/715 |
| 4,945,856 | 8/1990 | Stewart | 118/715 |
| 5,030,810 | 7/1991 | Haley et al. | 219/385 |
| 5,078,091 | 8/1992 | Stewart | 118/719 |
| 5,128,515 | 7/1992 | Tanaka | 219/390 |
| 5,167,718 | 12/1992 | Stewart | 118/729 |
| 5,268,033 | 12/1993 | Stewart | 118/719 |

FOREIGN PATENT DOCUMENTS

| | | |
|---|---|---|
| 53-11576 | 2/1978 | Japan . |
| 58-166726 | 3/1983 | Japan . |
| 59-74629 | 4/1984 | Japan . |
| 61-14195 | 1/1986 | Japan . |

OTHER PUBLICATIONS

Brochure—Union Carbide, re: Parylene Deposition Systes, 1979.

*Primary Examiner*—Ronald C. Capossela
*Attorney, Agent, or Firm*—Stetina Brunda & Buyan

[57] ABSTRACT

A cold trap for condensing and polymerizing residual vapor. The cold trap comprises a containment vessel which comprises a vertical sidewall defining a cylindrical inner surface of substantially constant diameter. Fluidly connected to the sidewall is a vapor inlet line which enters the containment vessel tangentially at a point near the top end thereof such that the vapor entering the containment vessel through the vapor inlet line will impinge against the inner surface of the sidewall and flow in a generally rotational pattern within the containment vessel. The cold trap further comprises a cooling member which is positioned within the containment vessel for facilitating the condensation and polymerization of the vapor.

9 Claims, 1 Drawing Sheet

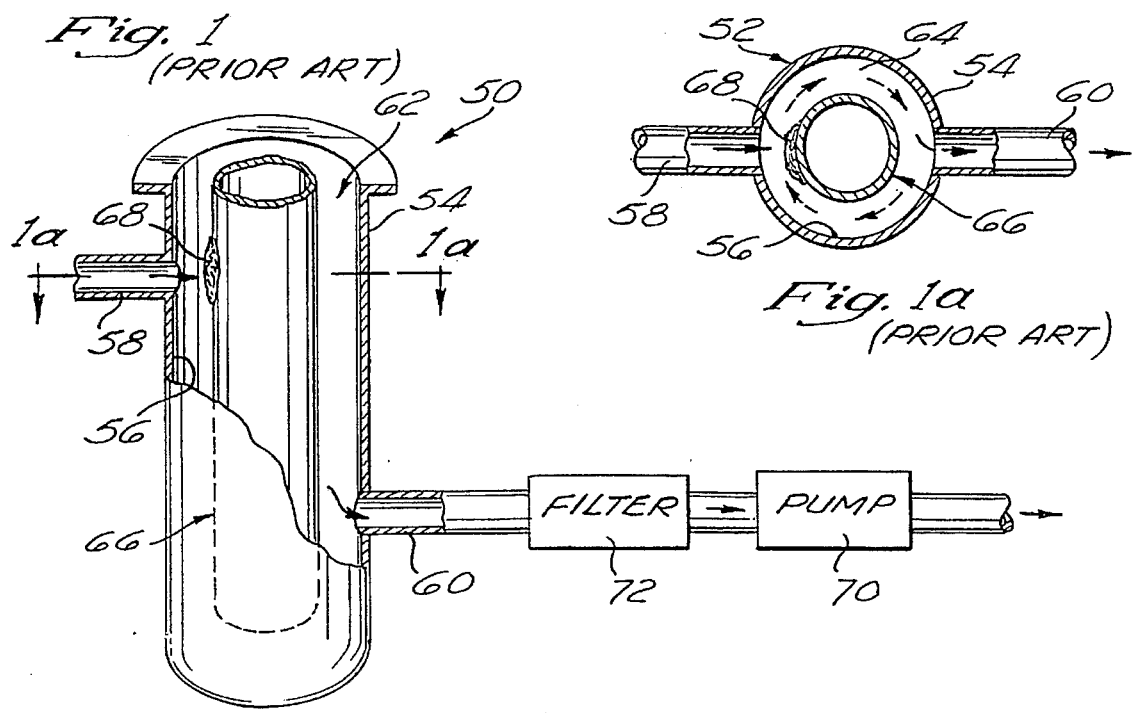
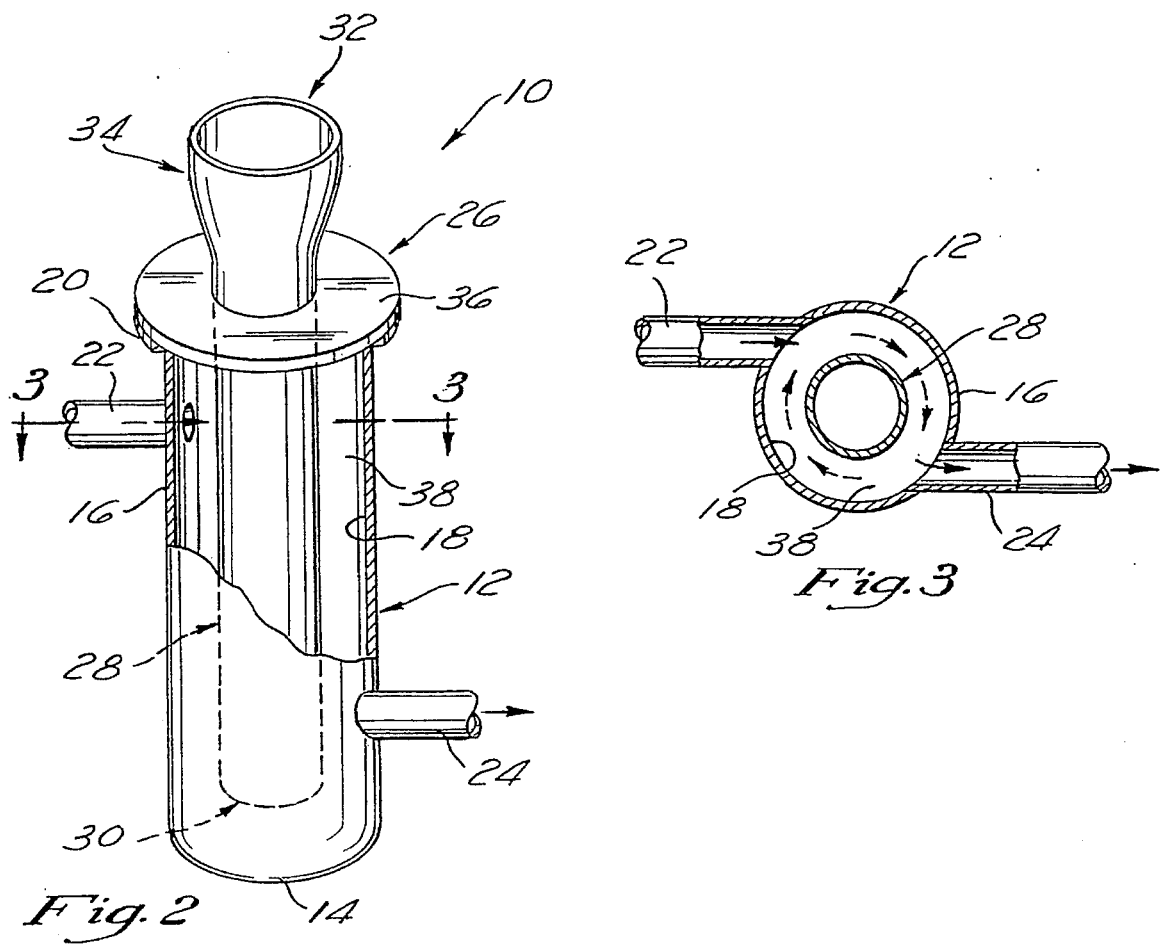

TANGENTIAL FLOW COLD TRAP

FIELD OF THE INVENTION

The present invention relates generally to devices used for depositing condensation coatings on various substrates, and more particularly to an improved cold trap for rapidly condensing and polymerizing residual parylene vapors.

BACKGROUND OF THE INVENTION

Para-xylylene polymers are employed as coatings for various electronic components due to their desirable physical and electrical properties. One advantage of poly-para-xylylene coatings is that the thin layers of such coatings are capable of exhibiting highly desirable physical and electrical properties. Because para-xylylene coatings are applied in very thin layers, heat tends to dissipate rapidly from the underlying components. Thus, the coated components cool down quickly and are less prone to temperature related degradation than similar components bearing other types of coating.

In further contrast to conventional polymer coatings, para-xylylenes are generally not prepolymerized prior to application on the coatable substrate. This is so because the para-xylylene polymers are not given to simple extrusion, melting or molding as are many of the conventional thermoplastics. Additionally, because the para-xylylene are generally insoluble in commonly used organic solvents, it is impractical to imply traditional solvent deposition techniques for applying poly-paraxylylene coatings.

Accordingly, in most commercial applications, paraxylylene polymers are deposited on desired substrates by a pyrolytic deposition process known specifically as the "parylene process." Such process begins with the vaporization of a cyclic di-para-xylylene dimer. The dimer is pyrolytically cleaved at temperatures of about 400° to 750° C. to form a reactive para-xylylene monomer vapor. Thereafter, the reactive monomer vapor is transferred to a deposition chamber wherein the desired substrates are located. Within the deposition chamber, the reactive monomer vapor condenses upon the desired substrates to form a para-xylylene polymer or co-polymer film.

Any monomer vapor which fails to condense within the deposition chamber is subsequently removed by a cold trap which is maintained at approximately −70° C.

The entire parylene process is generally carried out in a closed system under constant negative pressure. Such closed system may incorporate separate chambers for the (a) vaporization, (b) pyrolysis, and (c) deposition steps of the process, with such chambers being connected by way of appropriate plumbing or tubular connections.

In typical parylene deposition systems, the cold trap comprises a generally cylindrical containment vessel which is fluidly connected to the deposition chamber via a vapor inlet line, and fluidly connected to a vacuum pump via a vapor outlet line. The vacuum pump, when activated, maintains the system under constant negative pressure. Positioned within the containment vessel is a hollow cooling member which is adapted to be filled with a material such as liquid nitrogen. The cooling member is sized and configured such that when positioned within the containment vessel, an annular space is defined between a portion of the outer surface thereof and the inner surface of the containment vessel.

In prior art cold traps, the vapor inlet line of the containment vessel is oriented such that the monomer vapor which fails to condense within the deposition chamber flows radially into the containment vessel, and in particular the annular space defined between the inner surface thereof and the outer surface of the cooling member. Similarly, the vapor outlet line of the containment vessel is oriented such that air and any residual monomer vapor flows radially out of the annular space. Since monomer vapor will condense and polymerize on any reduced temperature object with which it comes in contact, the radial flow of residual monomer vapor into the cold trap, and hence the direct impingement of the vapor flow against the outer surface of the cooling member, causes parylene to "plate out" and build-up on the outer surface of the cooling member immediately adjacent the vapor inlet line of the containment vessel. Over time, such build-up has the effect of insulating a portion of the cooling member, thus causing less residual monomer vapor to be removed from the air/vapor mixture circulating through the cold trap. Additionally, in extreme cases, the build-up partially or completely clogs the vapor inlet line, thus preventing air/vapor flow into the cold trap which results in an improper coating process and/or damage to the deposition system.

Due to the inability of prior art cold traps to substantially remove residual monomer vapor from the air/vapor mixture circulating therethrough, the deposition systems incorporating the prior art cold traps are typically provided with a filter which is disposed within the outlet line intermediate the containment vessel and the vacuum pump. Since the previously described build-up of parylene diminishes the ability of the cold trap to effectively remove residual monomer vapor from the air/vapor mixture circulating therethrough, the filter is provided to prevent the vacuum pump from being exposed to any residual monomer vapor, and to further prevent any residual monomer vapor from being exhausted by the vacuum pump, and hence the deposition system, into the surrounding environment.

Though the filter functions to reduce the residual monomer vapor levels in the air/vapor mixture flowing therethrough, a small amount of monomer vapor usually still remains within the air stream entering the vacuum pump, particularly when the removal capacity of the cold trap is lessened by the previously described build-up of parylene on the cooling member. Since the condensation deposition of coatings is not substrate selective (i.e., the vapors have no way of seeking out only the desired substrates), the monomer vapor entering the vacuum pump condenses and polymerizes on any reduced temperature internal component of the pump with which it comes in contact. Such coating of the internal pump components necessitates the frequent cleaning thereof, and often results in pump failure thus requiring time consuming repair or the more expensive alternative of complete replacement. Additionally, a small amount of residual monomer vapor may be exhausted from the pump which could pose a health hazard. In addition to the vacuum pump requiring frequent cleaning, the build-up of parylene within the cold trap also necessitates the frequent and time-consuming cleaning of the cold trap, and in particular the outer surface of the cooling member. The present invention overcomes these and other deficiencies associated with prior art cold traps by providing a tangential flow cold trap which increases the effectiveness of the cold trap by allowing greater contact of the monomer vapor with the internal surfaces thereof, thus reducing the maintenance levels associated with the cold trap as well as the vacuum pump.

SUMMARY OF THE INVENTION

In accordance with the present invention, there is provided a cold trap for condensing and polymerizing residual vapor. The cold trap comprises a containment vessel which has top and bottom ends, and includes a vertical side wall defining a cylindrical inner surface of substantially constant diameter. Fluidly connected to the sidewall and entering the containment vessel tangentially at a point near the top end thereof is a vapor inlet line. In the preferred embodiment, vapor passing through the vapor inlet line enters the containment vessel in an initially horizontal vector and subsequently impinges against the inner surface of the sidewall thus causing the vapor to flow in a generally rotational pattern within the containment vessel. The vapor inlet line extends fully through the sidewall, but is terminated flush with the inner surface thereof such that no portion of the vapor inlet line extends beyond the inner surface. Also fluidly connected to the sidewall and exiting the containment vessel tangentially at a point near the bottom end thereof is a vapor outlet line. The vapor outlet line also extends fully through the sidewall and is terminated flush with the inner surface thereof.

The cold trap constructed in accordance with the present invention further comprises a cooling member which is positioned within the containment vessel for facilitating the condensation and polymerization of the vapor. The cooling member comprises a tubular body portion which defines an outer surface and includes a circular flange portion extending radially therefrom. The body portion is sized and configured such that an annular space for the rotating vapor is defined between the outer surface thereof and the inner surface of the sidewall when the cooling member is positioned within the containment vessel. Additionally, the flange portion of the cooling member is adapted to form a vapor tight seal about the top edge of the sidewall when the cooling member is positioned within the containment vessel.

BRIEF DESCRIPTION OF THE DRAWINGS

These, as well as other features of the present invention, will become more apparent upon reference to the drawings wherein:

FIG. 1 is a partial cross-sectional view of a prior art cold trap;

FIG. 1a is a cross-sectional view taken along line 1a—1a of FIG. 1;

FIG. 2 is a partial cross-sectional view of a cold trap constructed in accordance with the present invention; and FIG. 3 is a cross-sectional view taken along line 3—3 of FIG. 2.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 2 perspectively illustrates a cold trap 10 constructed in accordance with the present invention. The cold trap 10 comprises a generally cylindrical containment vessel 12 which includes a floor portion 14 and a vertical sidewall portion 16. The sidewall portion 16 of the containment vessel 12 defines a cylindrical inner surface 18 of substantially constant diameter and a top edge having a circular flange portion 20 extending radially outward therefrom.

Fluidly connected to the sidewall portion 16 of the containment vessel 12 is a vapor inlet line 22. As seen in FIGS. 2 and 3, the vapor inlet line 22 extends horizontally relative to the sidewall portion 16, and is oriented so as to communicate with the interior of the containment vessel 12 tangentially at a point near the flange portion 20 thereof. The fluid connection of the vapor inlet line 22 to the containment vessel 12 is preferably facilitated by extending the vapor inlet line 22 fully through the sidewall portion 16. However, the vapor inlet line 22 is terminated flush with the inner surface 18 such that no portion of the vapor inlet line 22 extends beyond the inner surface 18. In addition to the vapor inlet line 22, also fluidly connected to the containment vessel 12 is a vapor outlet line 24. Like the vapor inlet line 22, the vapor outlet line 24 extends horizontally relative to the sidewall portion 16 and is oriented so as to communicate with the interior of the containment vessel 12 tangentially at a point near the floor portion 14 thereof. The fluid connection of the vapor outlet line 24 to the containment vessel 12 is also preferably facilitated by extending the vapor outlet line 24 fully through the sidewall portion 16. However, the vapor outlet line 24 is also terminated flush with the inner surface 18 such that no portion of the vapor outlet line 24 extends beyond the inner surface 18.

The cold trap 10 constructed in accordance with the present invention further comprises a cooling member 26 which is partially disposed within the interior of the containment vessel 12 and is used for facilitating the condensation and polymerization of the air/monomer vapor mixture circulating through the cold trap 10. The cooling member 26 comprises an elongate, tubular body portion 28 having a closed bottom end 30 and an open top end 32. The body portion 28 defines an enlarged, flared region 34 adjacent the top end 32 thereof thus resulting in the diameter of the top end 32 substantially exceeding the diameter of the bottom end 34. Extending radially outward from the body portion 28 adjacent the flared region 34 is a circularly configured flange portion 36.

In the preferred embodiment, the cooling member 26 is positioned within the containment vessel 12 such that the body portion 28 thereof (excluding the flared region 34) resides within the interior of the containment vessel 12. In this respect, neither the flared region 34 of the body portion 28 or flange portion 36 are disposed within the interior of the containment vessel 12 when the cooling member 26 is properly interfaced thereto. As best seen in FIG. 2, when the cooling member 26 is inserted into the containment vessel 12, the peripheral region of the flange portion 36 is abutted against and forms a vapor tight seal about the flange portion 20 of the containment vessel 12. Additionally, the flange portion 36 is preferably sized such that the peripheral edge thereof is substantially flush with the peripheral edge of the flange portion 20 when the cooling member 26 is inserted into the containment vessel 12.

Importantly, the diameter of the body portion 28 (excluding the flared region 34) is sized such that when the cooling member 26 is properly positioned within the containment vessel 12, an annular space 38 is defined between the outer surface of the body portion 28 and the inner surface 18 of the containment vessel 12. Additionally, the length of the body portion 28 is such that when the cooling member 26 is properly positioned within the containment vessel 12, a gap is defined between the bottom end 30 and the floor portion 14 which has a width substantially equal to the width of the space 38.

As previously indicated, monomer vapor will condense and polymerize on any reduced temperature object with which it comes in contact. Thus, in the preferred embodiment, the body portion 28 of the cooling member 26 is adapted to be filled with a material such as liquid nitrogen, carbon dioxide or helium. Though not shown, subsequent to the filling of the body portion 28 with one of the aforementioned materials, the open top end 32 of the body portion 28 is enclosed by a cap member which is attached to the rim of the flared region 34 defining the top end 32. The cooling member 26, and in particular the body portion 28 thereof, is constructed from a material adapted to permit a thermal transfer so as to cool the monomer vapor entering the space 38 from the vapor inlet line 22, thereby causing any residual parylene to "plate out", as will be discussed in more detail below.

As best seen in FIG. 3, due to the orientation of the vapor inlet line 22 relative to the containment vessel 12, the air/monomer vapor mixture flowing from the deposition chamber through the vapor inlet line 22 will enter the interior of the containment vessel 12 in an initially horizontal vector, and will subsequently impinge against the inner surface 18 of the sidewall portion 16, thus causing the vapor to flow downwardly in a generally rotational pattern within the space 38. Advantageously, the rotational flow pattern of the monomer vapor achieved by the tangential entry thereof into the space 38 causes turbulence which increases the effectiveness of the cold trap 12 by facilitating greater contact of the monomer vapor with the reduced temperature outer surface of the body portion 28 and inner surface 18 of the sidewall portion 16.

Referring now to FIGS. 1 and 1a, illustrated is a cold trap 50 constructed in accordance with the prior art. In the prior art, the cold trap 50 comprises a cylindrical containment vessel 52 which is configured identically to the previously described containment vessel 12, and includes a vertical sidewall portion 54 which defines an inner surface 56 of substantially constant diameter. Fluidly connected to the containment vessel 52, and in particular the sidewall portion 54 thereof, is a vapor inlet line 58 and a vapor outlet line 60. The cold trap 50 further comprises a cooling member 62 which is identical to the cooling member 26, and interfaced to the containment vessel 52 in the same manner previously described in relation to the interface of the cooling member 26 to the containment vessel 12. In this respect, when the cooling member 62 is properly positioned within the interior of the containment vessel 62, an annular space 64 is defined between the inner surface 56 of the sidewall portion 54 and the outer surface of the tubular body portion 66 of the cooling member 62.

In contrast to the orientation of the vapor inlet line 22 relative to the containment vessel 12, the vapor inlet line 58 of the prior art cold trap 50 is oriented relative to the containment vessel 52 such that the air/monomer vapor mixture passing therethrough flows radially into the annular space 64. Similarly, the vapor outlet line 60 is oriented such that air and any residual monomer vapor flows radially out of the space 64. Since, as previously explained, the monomer vapor will condense and polymerize on any reduced temperature object with which it comes in contact, the radial flow of residual monomer vapor into the space 64, and hence the direct impingement of the vapor flow against the outer surface of the body portion 66 causes parylene to "plate out" and build-up as a clump 68 which forms on the outer surface of the body portion 66 immediately adjacent the vapor inlet line 58. Over time, the clump 68, which gradually grows in size, has the effect of insulating a portion of the body portion 66, thus causing less residual monomer vapor to be removed from the air/vapor mixture circulating through the space 64. Additionally, in extreme cases, the clump 68 may grow to a size which partially or completely clogs the vapor inlet line 58, thus preventing air/vapor flow into the space 64 which results in an improper coating process and/or damage to the deposition system.

In a typical prior art parylene deposition system, the vapor outlet line 60, in addition to being fluidly connected to the containment vessel 52, is also fluidly connected to a vacuum pump 70. When activated, the vacuum pump 70 maintains the system under constant negative pressure, thus causing the air/monomer vapor mixture to be drawn from the deposition chamber into the cold trap 50 via the vapor inlet line 58, and subsequently drawn from the cold trap 50 via the vapor outlet line 60. As previously explained, due to the inability of the prior art cold trap 50 to substantially remove residual monomer vapor from the air/vapor mixture circulating therethrough, those deposition systems incorporating the cold trap 50 are typically provided with a filter 72 which is disposed within the vapor outlet line 60 intermediate the containment vessel 52 and vacuum pump 70. Since the formation of the previously described clump 68 diminishes the ability of the cold trap 50 to effectively remove residual monomer vapor from the air/vapor mixture circulating therethrough, the filter 72 is provided to prevent the vacuum pump 70 from being exposed to any residual monomer vapor, and to further prevent any residual monomer vapor from being exhausted from the vacuum pump 70 and hence the deposition system, into the surrounding environment.

Though the filter 72 functions to reduce the residual monomer vapor levels in the air/vapor mixture flowing therethrough, a small amount of monomer vapor usually still remains within the airstream entering the vacuum pump 70, particularly when the removal capacity of the cold trap 50 is lessened by the formation of the clump 68. Since the condensation deposition of the monomer vapor is not substrate selective, the monomer vapor entering the vacuum pump 70 condenses and polymerizes on any reduced temperature internal component thereof with which it comes in contact. Such coating of the internal components of the vacuum pump 70 often results in the failure thereof, thus requiring time consuming repair or the more expensive alternative of complete replacement. Additionally, a small amount of residual monomer vapor may be exhausted from the vacuum pump 70 which could pose a health hazard. In addition to the vacuum pump 70 requiring frequent cleaning, the formation of the clump 68 necessitates the frequent and time-consuming cleaning of the cold trap 50, and in particular the cooling member 62 thereof.

Advantageously, the aforementioned deficiencies associated with the prior art cold trap 50 are eliminated in the cold trap 10 constructed in accordance with the present invention due to the tangential entry of the air/monomer vapor mixture into the space 38 from the vapor inlet line 22. The subsequent rotational flow of the monomer vapor through the space 38 and into the vapor outlet line 24 facilitates greater contact of the vapor with the inner surface 18 of the sidewall portion 16 and outer surface of the body portion 28, thus significantly increasing the monomer vapor removing effectiveness of the cold trap 10. Though not shown, the vapor outlet line 24 of the cold trap 10 is itself typically fluidly connected to a vacuum pump, and includes a filter disposed therein, in the same configuration shown in FIG. 1. However, due to the increased removal of monomer vapor facilitated by the cold trap 10, the vacuum pump associated therewith is exposed to significantly decreased levels of residual monomer vapor, with the filter disposed between the vacuum pump and containment vessel 12 removing virtually all residual monomer vapor not "plated out" by the cold trap 10. As such, the vacuum pump associated with the cold trap 10 requires significantly less maintenance and/or repair than the vacuum pump 70 used in conjunction with the prior art cold trap 50. Additionally, since the monomer vapor entering the containment vessel 12 via the vapor inlet line 22 does not impinge directly against the outer surface of the body portion 28, a clump is not formed thereon, thus necessitating less frequent cleaning of the cooling member 26.

Additional modifications and improvements of the present invention may also be apparent to those skilled in the art. For example, though the vapor inlet and outlet lines 22, 24 are preferably oriented so as to be substantially diametrically opposite each other, it will be recognized that they may be interfaced to any point of the sidewall portion 16 about the circumference thereof, so long as they communicate with the space 38 tangentially. Additionally, though the vapor inlet line 22 is preferably oriented near the flange portion 20 and the vapor outlet line 24 oriented near the floor portion 14, it will be recognized that they may be reversed (i.e., the vapor inlet line 22 oriented near the floor portion 14, with the vapor outlet line 24 being oriented near the flange portion 20). In this respect, the residual monomer vapor entering the space 38 tangentially will flow in a rotational pattern therewithin in an upward rather than a downward direction. As such, the parts described and illustrated herein are intended to represent only a certain embodiment of the present invention, and are not intended to serve as limitations of alternative devices within the spirit and scope of the invention.

What is claimed is:

1. A cold trap for condensing and polymerizing residual vapor, said cold trap comprising:

a containment vessel having top and bottom ends;

a vapor inlet line fluidly connected to and entering said containment vessel tangentially at a point near the top end thereof and a vapor outlet line fluidly connected to and exiting the containment vessel tangentially at a point near the bottom end thereof such that the vapor entering the containment vessel through the vapor inlet line and exiting the containment vessel through the vapor outlet line will flow in a generally rotational pattern within the containment vessel; and a cooling member positioned within said containment vessel for facilitating the condensation and polymerization of the vapor.

2. The cold trap of claim 1 wherein:

said cooling member comprises a tubular body portion defining an outer surface; and said containment vessel comprises a vertical sidewall defining a cylindrical inner surface of substantially constant diameter;

said body portion being sized and configured such that an annular space for the rotating vapor is defined between the outer surface thereof and the inner surface of the sidewall when the cooling member is positioned within the containment vessel.

3. The cold trap of claim 2 wherein:

the sidewall of the containment vessel has a generally cylindrical configuration and includes a top edge; and the cooling member includes a circular flange portion extending radially from the body portion thereof;

said flange portion forming a vapor tight seal about the top edge of the sidewall when the cooling member is positioned within the containment vessel.

4. A cold trap for condensing and polymerizing residual vapor, said cold trap comprising:

a containment vessel comprising a vertical sidewall defining a cylindrical inner surface of substantially constant diameter;

a vapor inlet line disposed horizontally tangential to the sidewall and extending therethrough such that vapor passing through said vapor inlet line will enter said containment vessel in an initially horizontal vector and will subsequently impinge against the inner surface of the sidewall causing the vapor to flow in a generally rotational pattern within said containment vessel;

a vapor outlet line disposed horizontally tangential to the sidewall and extending therethrouqh; and a cooling member positioned within said containment vessel for facilitating the condensation and polymerization of the vapor.

5. The cold trap of claim 4 wherein said vapor inlet line extends fully through said sidewall but is terminated flush with the inner surface thereof such that no portion of the vapor inlet line extends beyond the inner surface.

6. The cold trap of claim 5 wherein said vapor outlet line extends fully through said sidewall but is terminated flush with the inner surface thereof such that no portion of the vapor outlet line extends beyond the inner surface.

7. The cold trap of claim 4 wherein said cooling member comprises a tubular body portion which defines an outer surface and is sized and configured such that an annular space for the rotating vapor is defined between the outer surface thereof and the inner surface of the sidewall when the cooling member is positioned within the containment vessel.

8. The cold trap of claim 7 wherein:

the sidewall of the containment vessel has a generally cylindrical configuration and includes a top edge; and said cooling member includes a circular flange portion extending radially from the body portion thereof, said flange portion forming a vapor tight seal about the top edge of the sidewall when the cooling member is positioned within the containment vessel.

9. A cold trap for condensing and polymerizing residual vapor, said cold trap comprising:

a containment vessel;

a vapor inlet line fluidly connected to and tangentially entering said containment vessel and a vapor outlet line fluidly connected to and tangentially exiting the containment vessel such that the vapor entering the containment vessel through the vapor inlet line and exiting the containment vessel through the vapor outlet line will flow in a generally rotational pattern within the containment vessel; and a cooling member positioned within said containment vessel for facilitating the condensation and polymerization of the vapor.

* * * * *